US009888171B2

(12) United States Patent
Chou et al.

(10) Patent No.: US 9,888,171 B2
(45) Date of Patent: Feb. 6, 2018

(54) MOBILE CAMERA DEVICE CAPABLE OF IMPROVING FACIAL PATTERNS OF A CAPTURED IMAGE

(71) Applicant: HTC Corporation, Taoyuan County (TW)

(72) Inventors: Peter Chou, Taoyuan County (TW); Drew Bamford, Bellevue, WA (US); John C. Wang, Taoyuan County (TW); Sung-Hao Lin, Taoyuan County (TW); Jr-Ben Tian, Taoyuan County (TW); Hao-Wei Miao, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 143 days.

(21) Appl. No.: 13/754,908

(22) Filed: Jan. 31, 2013

(65) Prior Publication Data

US 2013/0208167 A1    Aug. 15, 2013

Related U.S. Application Data

(60) Provisional application No. 61/598,291, filed on Feb. 13, 2012.

(51) Int. Cl.
  *H04N 5/228*    (2006.01)
  *G06K 9/62*    (2006.01)
  *H04N 5/232*    (2006.01)
(52) U.S. Cl.
  CPC .............................. *H04N 5/23219* (2013.01)
(58) Field of Classification Search
  CPC ........... H04N 5/23219; G06K 9/00268; G06K 9/00308

USPC .......... 348/333.02, 333.05, 333.11, 345, 352
See application file for complete search history.

(56) References Cited

U.S. PATENT DOCUMENTS

| 2008/0285791 | A1* | 11/2008 | Suzuki ............... G06K 9/00248 382/100 |
| 2009/0110243 | A1 | 4/2009 | Uchiyama |
| 2009/0135269 | A1* | 5/2009 | Nozaki et al. ............. 348/222.1 |
| 2009/0201389 | A1* | 8/2009 | Jung et al. ................. 348/222.1 |
| 2009/0237515 | A1* | 9/2009 | Lee ..................... H04N 5/23219 348/207.99 |
| 2010/0245614 | A1 | 9/2010 | Matsunaga |
| 2010/0254609 | A1 | 10/2010 | Chen |
| 2011/0052081 | A1* | 3/2011 | Onoe et al. .................. 382/203 |
| 2011/0069194 | A1* | 3/2011 | Okada ........................ 348/222.1 |

FOREIGN PATENT DOCUMENTS

| CN | 101854484 A | 10/2010 |
| CN | 102004897 A | 4/2011 |

OTHER PUBLICATIONS

Notice of Allowance dated Dec. 25, 2014 for the Taiwan application No. 102104628, filing date: Feb. 6, 2013, p. 1-4.
Office action dated Aug. 18, 2015 for the China application No. 201310051284.2, filing date Feb. 16, 2013.

* cited by examiner

*Primary Examiner* — Twyler Haskins
*Assistant Examiner* — Carramah J Quiett
(74) *Attorney, Agent, or Firm* — Winston Hsu

(57) ABSTRACT

By grading preview images of original images for the purpose of filtering eye blink patterns off and/or introducing face smile patterns, a result image can be generated with least eye blink patterns and most face smile patterns for satisfying image quality.

13 Claims, 5 Drawing Sheets

MOBILE CAMERA DEVICE CAPABLE OF IMPROVING FACIAL PATTERNS OF A CAPTURED IMAGE

CROSS REFERENCE TO RELATED APPLICATIONS

This application claims priority of U.S. Provisional Application No. 61/598,291 filed on Feb. 13, 2012.

BACKGROUND OF THE INVENTION

1. Field of the Invention

The present invention relates to an image capture method and a mobile camera device thereof, and more particularly, an image capture method for capturing an image filtering off eye blink patterns and a mobile camera device utilizing the image capture method.

2. Description of the Prior Art

A conventional digital camera may be capable of supporting a smart camera shooting function by detecting occurrence of eye blinks or face smiles on a captured image.

However, the conventional digital camera is only capable of detecting whether eye blinks or face smiles occur on the image and still fails to efficiently capture an image having satisfying image presentation for a user of the conventional digital camera because the conventional digital camera is not capable of efficiently filtering the eye blinks off from the captured image or introducing face smiles on the captured image.

SUMMARY OF THE INVENTION

The claimed invention discloses an image capture method. The method comprises capturing a first original image; generating a first preview image corresponding to the first original image; detecting the first preview image for eye blink patterns; capturing a consecutive plurality of second original images in response to at least one eye blink pattern is detected in the first preview image; generating a plurality of second preview frames corresponding to the consecutive plurality of second original frames respectively; detecting the plurality of second preview images for eye blink patterns; and generating a result image based on least eye blink patterns detected on the first preview image and the consecutive plurality of second preview images. The first preview image and the plurality of second preview images are of smaller size and lower resolution than the first original image and the plurality of second original images. The first original image, the first preview image, the consecutive plurality of second original images, the plurality of second preview images, and the result image are corresponding to at least partially the same scene.

The claimed invention also discloses an image capture method. The method comprises capturing a first original image; detecting eye blink patterns in the first original image; capturing a consecutive plurality of second original images in response to at least one eye blink pattern is detected in the first original image; detecting eye blink patterns and face smile patterns in the plurality of second original images; and generating a result image based on least eye blink patterns and most face smile patterns detected on the first original image and the consecutive plurality of second original images.

The claimed invention further discloses a mobile camera device. The mobile camera device comprises an image sensor and an image signal processor. The image sensor is configured to capture a first original image and configured to capture a consecutive plurality of second original images in response to at least one eye blink pattern is detected in the first original image. The image signal processor comprises an image preview module, an eye blink detection module, and an image composition module. The image preview module is configured to generate a plurality of preview images corresponding to the plurality of original images respectively. The eye blink detection module is configured to detect eye blink patterns in the plurality of preview images. The image composition module is configured to generate a result image based on least eye blink patterns detected in the plurality of preview images. The plurality of preview images are of smaller size and lower resolution than the plurality of original images.

These and other objectives of the present invention will no doubt become obvious to those of ordinary skill in the art after reading the following detailed description of the preferred embodiment that is illustrated in the various figures and drawings.

DETAILED DESCRIPTION

For improving image quality in comparison to the conventional digital camera mentioned above, the present invention discloses an image capture method for efficiently filtering eye blink patterns off a result image and a mobile camera device utilizing the disclosed image capture method. More specifically, in some embodiments of the present invention, the disclosed image capturing method further intends to introduce face smile patterns in the result image for entertainment.

Figure 1:
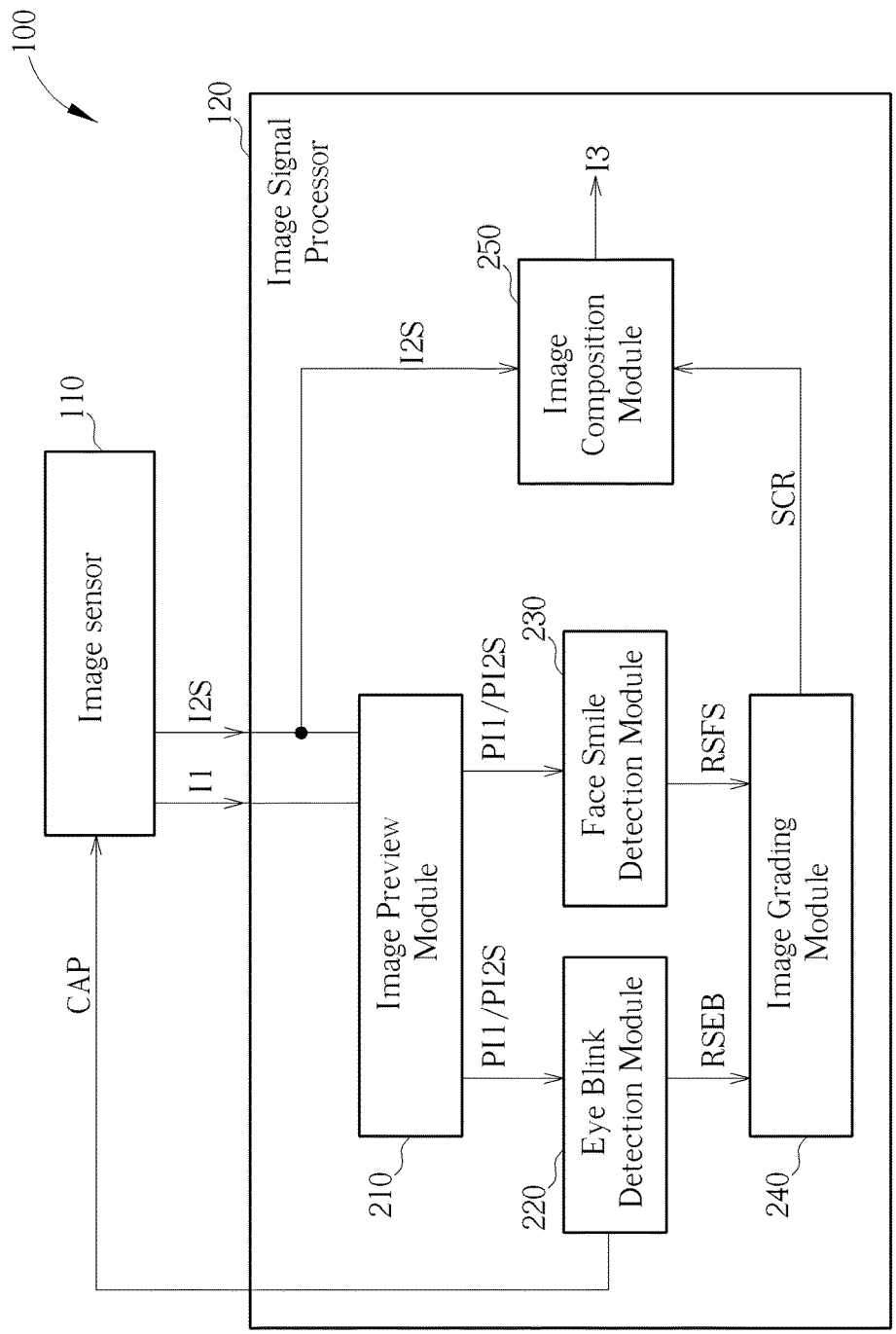
FIG. 1 illustrates a mobile camera device according to one embodiment of the present invention.

Please refer to FIG. 1, which illustrates a mobile camera device 100 according to one embodiment of the present invention. As shown in FIG. 1, the mobile camera device 100 includes an image sensor 110 and an image signal processor 120.

The image sensor 110 is configured to capture an original image for the mobile camera device 100. The image signal processor 120 comprises an image preview module 210, an eye blink detection module 220, a face smile detection module 230, an image grading module 240, and an image composition module 250.

The image preview module 210 is configured to generate a preview image corresponding to the original image captured by the image sensor 110, where the preview image is of a smaller size and lower resolution than the original image.

The eye blink module 220 is configured to detect eye blink patterns occurring on the preview image and to determine a level of eye blink resemblance of the preview image, such as a number or score of detected eye blink patterns.

The face smile detection module 230 is optionally activated, and is configured to detect face smile patterns occurring on the preview image and to determine a level of face smile resemblance of the preview image, such as a number or score of detected face smile patterns.

The image grading module 240 is configured to grade the preview image by the level of eye blink patterns and/or the level of face smile patterns, where a preview image having less eye blink patterns and/or more face smile patterns may earn a higher grade in embodiments of the present invention.

The image composition module 250 is configured to generate a result image by selecting an original image having a highest-grade preview image or by combining a portion of original images having highest-grade preview images in comparison to other original images.

Figure 2:
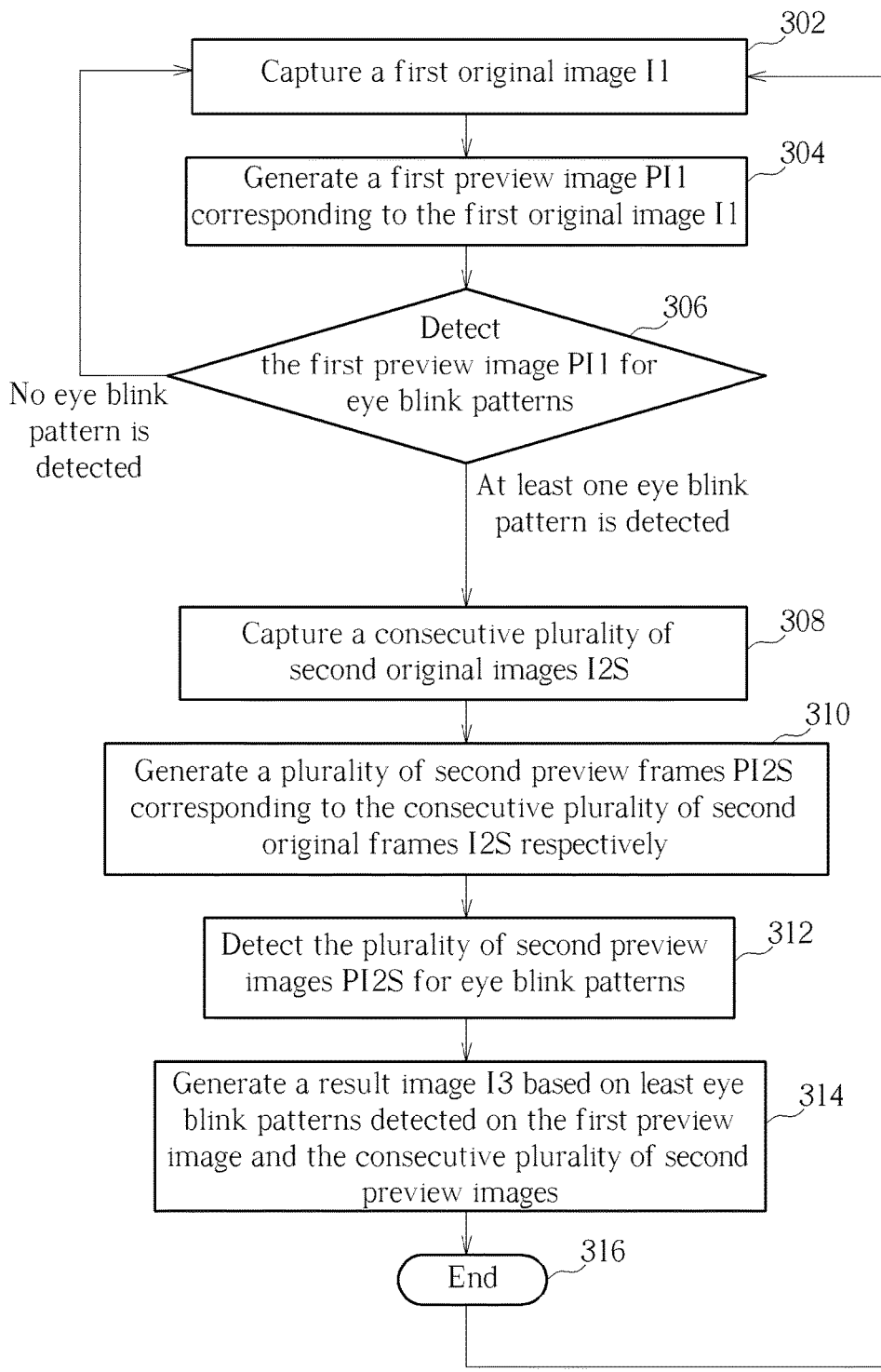
FIG. 2 illustrates the image capture method according to one embodiment of the present invention.

Please refer to FIG. 2, which illustrates the image capture method of merely considering eye blink patterns for grading according to a first embodiment of the present invention. As shown in FIG. 2, the image capturing method includes the following steps:

Step 302: Capture a first original image I1.

Step 304: Generate a first preview image PI1 corresponding to the first original image I1.

Step 306: Detect the first preview image PI1 for eye blink patterns. In response to at least one eye blink pattern is detected on the preview image PI1, go to Step 308. Else, in response to no eye blink pattern is detected on the preview image I1, go to Step 316 and the flow ends.

Step 308: Capture a consecutive plurality of second original images PI2S.

Step 310: Generate a plurality of second preview frames PI2S corresponding to the consecutive plurality of second original frames I2S respectively.

Step 312: Detect the plurality of second preview images PI2S for eye blink patterns.

Step 314: Generate a result image based on least eye blink patterns detected in the first preview image PI1 and the consecutive plurality of second preview images PI2S. And the flow ends until another input is received from the user for capturing an image.

Step 316: End.

Please also refer to FIG. 1. In the steps shown in FIG. 2, the face smile detection module 230 is optionally inactivated so that face smile patterns are not detected nor considered for grading a preview image. Note that the first original image I1, the first preview image PI1, the consecutive plurality of second original images I2S, the plurality of second preview images PI2S, and the result image I3 may correspond to a same scene or at least partially the same scene.

In Step 302, the image sensor 110 captures the first original image I1 and transmits the first original image I1 to the image preview module 210, for example, in response to a touch command triggered by a user of the mobile camera device 100 in aspects of user experience.

In Step 304, the image preview module 210 generates the first preview image PI1 corresponding to the first original image I1 and transmits the first preview image PI1 to the eye blink detection module 220. As mentioned before about the image preview module 210, the preview image PI1 is of smaller size and lower resolution than the original image I1.

In Step 306, the eye blink detection module 220 performs eye blink detection on the preview image PI1 for confirming if there is any eye blink pattern occurring on the preview image PI1. By checking the first preview image PI1 instead of checking the first original image I1, significant processing time can be saved since the first preview image PI1 is of smaller size and lower resolution than the first original image I1 does.

In Step 308, when the eye blink detection module 220 finds at least one eye blink pattern on the first preview image PI1, the eye blink detection module 220 issues an instruction signal CAP to the image sensor 110 for instantly capturing the consecutive plurality of second original images I2S, for example, under an auto burst camera mode of the mobile camera device 100. The image sensor 110 also transmits the consecutive plurality of second original images I2S to the image preview module 210.

In Step 310, the image preview module 210 generates the plurality of second preview images PI2S corresponding to the consecutive plurality of second original images I2S, and transmits the first preview image PI1 and the plurality of second preview images PI2S to the eye blink detection module 220.

In Step 312, the eye blink detection module 220 performs eye blink detection on each of the plurality of second preview images PI2S for confirming a level of eye blink resemblance, for example, how many eye blink patterns on each of the first preview image PI1 and the plurality of second preview images PI2S. An eye blink detection result signal RESB is then generated by the eye blink detection module 220 for indicating the level of eye blink resemblance of each of the first preview image PI1 and the plurality of second preview images PI2S, and is transmitted to the image grading module 240. Similarly, by checking the plurality of second preview images PI2S instead of checking the first original image I1 and the consecutively plurality of second original images I2S, significant processing time can be saved since each of the plurality of preview images is of smaller size and lower resolution than its corresponding original image.

In Step 314, the image grading module 240 grades each of the first preview image PI1 and the plurality of second preview images PI2S a score, where a preview image having a lower level of eye blink resemblance, for example, fewer eye blink patterns, is graded with a higher score than another second preview image PI2S having a higher level of eye blink resemblance, for example, more eye blink patterns. The image grading module 240 generates a score signal SCR indicating scores of each of the first preview image PI1 and the plurality of second preview images PI2S and transmits the score signal SCR to the image composition module 250. At last, the image composition module 250 generates the result image I3 according to the scores indicated by the score signal SCR. The result image I3 may further be stored in the mobile camera device 100 using a storage unit or be displayed on the mobile camera device using a display unit in at least one embodiment of the present invention.

In one embodiment of the present invention, the image composition module 250 generates the result image I3 by choosing a candidate from the first original image I1 and the consecutive plurality of second original images I2S to be the result image I3, where the candidate has a corresponding preview image having the highest score among all of the plurality of preview images. Note that the highest score indicates a lowest level of eye blink resemblance in said embodiment.

In one embodiment of the present invention, the image composition module 250 generates the result image I3 by combining a candidate portion from the consecutive plurality of second original images I2S and the first original image I1, where the candidate portion includes part of the consecutive plurality of second original images I2S and the first original image I1 having corresponding second preview images PI2S and the first preview image I1 having highest scores among all of the plurality of preview images. How the candidate portion of second original images I2S and the first preview image I1 is combined by the image composition module 250 with respect to the embodiment shown in FIG. 2 or FIG. 3 will be illustrated and described in FIG. 4 or FIG. 5. Note that the highest scores indicate lowest levels of eye blink resemblance in said embodiment.

With the aid of the image capture method disclosed in FIG. 2, eye blink patterns can be efficiently filtered off from the result image I3 to reach satisfying image presentation for the user of the mobile camera device 100. Processing time may also be significantly saved because of eye blink detection performed on preview images.

Figure 3:
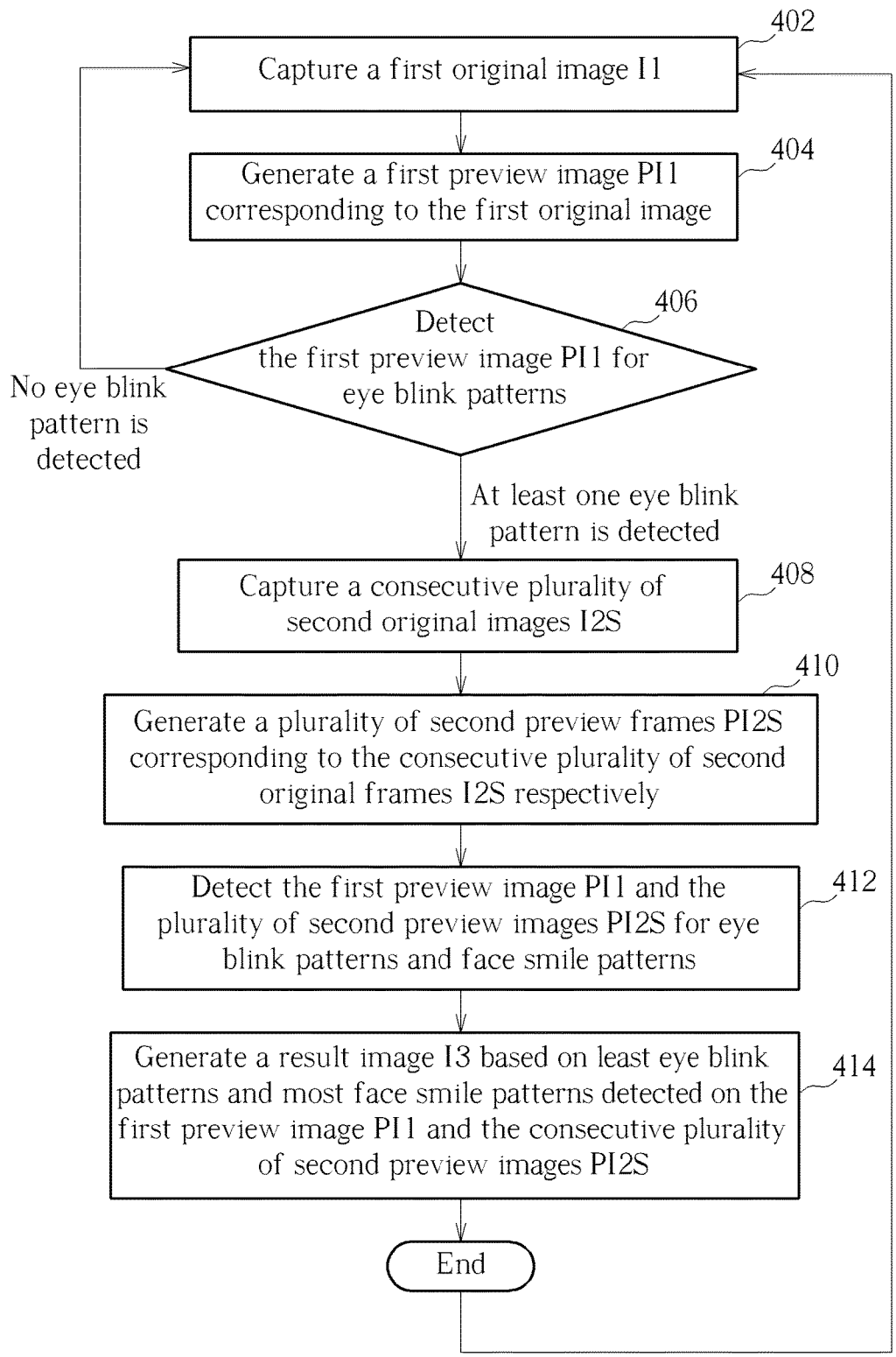
FIG. 3 illustrates the image capture method according to one embodiment of the present invention.

Please refer to FIG. 3, which illustrates the image capture method of considering both eye blink patterns and face smile patterns for grading according to a second embodiment of the present invention. As shown in FIG. 3, the image capture method includes the following steps:

Step 402: Capture a first original image I1.

Step 404: Generate a first preview image PI1 corresponding to the first original image I1.

Step 406: Detect the first preview image PI1 for eye blink patterns. In response to at least one eye blink pattern is detected on the first preview image PI1, go to Step 408. Else, in response to no eye blink pattern is detected on the first preview image PI1, go to Step 416 and the flow ends.

Step 408: Capture a consecutive plurality of second original images I2S.

Step 410: Generate a plurality of second preview frames PI2S corresponding to the consecutive plurality of second original frames I2S respectively.

Step 412: Detect the first preview image PI1 and the plurality of second preview images for eye blink patterns and face smile patterns PI2S.

Step 414: Generate a result image I3 based on the least eye blink patterns and most face smile patterns detected on the first preview image PI1 and the consecutive plurality of second preview images.

Step 416: End.

Details and purposes of Steps 402-410 are same as details of Steps 302-310 so that repeated details in Steps 402-410 are not further described.

In Step 412, the eye blink detection module 220 performs eye blink detection on each of the first preview image PI1 and the plurality of second preview images PI2S for confirming a level of eye blink resemblance. Similarly, the face smile detection module 230 also receives the plurality of second preview images PI2S from the image preview module 210 and performs face smile detection on each of the first preview image PI1 and the plurality of second preview images PI2S for confirming a level of face smile resemblance, for example, a number or score of face smile patterns or lift angles of a mouth patterns.

Besides the eye blink detection result signal RESB, a face smile detection result signal RSFS is also generated by the face smile detection module 230 for indicating the level of face smile resemblance of each of the first preview image PI1 and the plurality of second preview images PI2S, and is transmitted to the image grading module 240.

In Step 414, the image grading module 240 grades each of the first preview image PI1 and the plurality of second preview images PI2S a score, where a preview image having a lower level of eye blink resemblance and/or a higher level of face smile resemblance is graded with a higher score than other preview images having a higher level of eye blink resemblance and/or a lower level of face smile resemblance. The image grading module 240 generates the score signal SCR indicating scores of each of the first preview image PI1 and the plurality of second preview images PI2S, and transmits the score signal SCR to the image composition module 250. At last, the image composition module 250 generates the result image I3 according to the scores indicated by the score signal SCR.

How the image composition module 250 generates the result image I3 is the same as mentioned in details of FIG. 2 so that repeated descriptions are saved for brevity.

With the aid of the image capture method disclosed in FIG. 3, besides filtering off the eye blink patterns from the result image I3, face smile patterns may further be considered so that face smile patterns and entertainment may be introduced in the result image I3 more easily.

Figure 4:
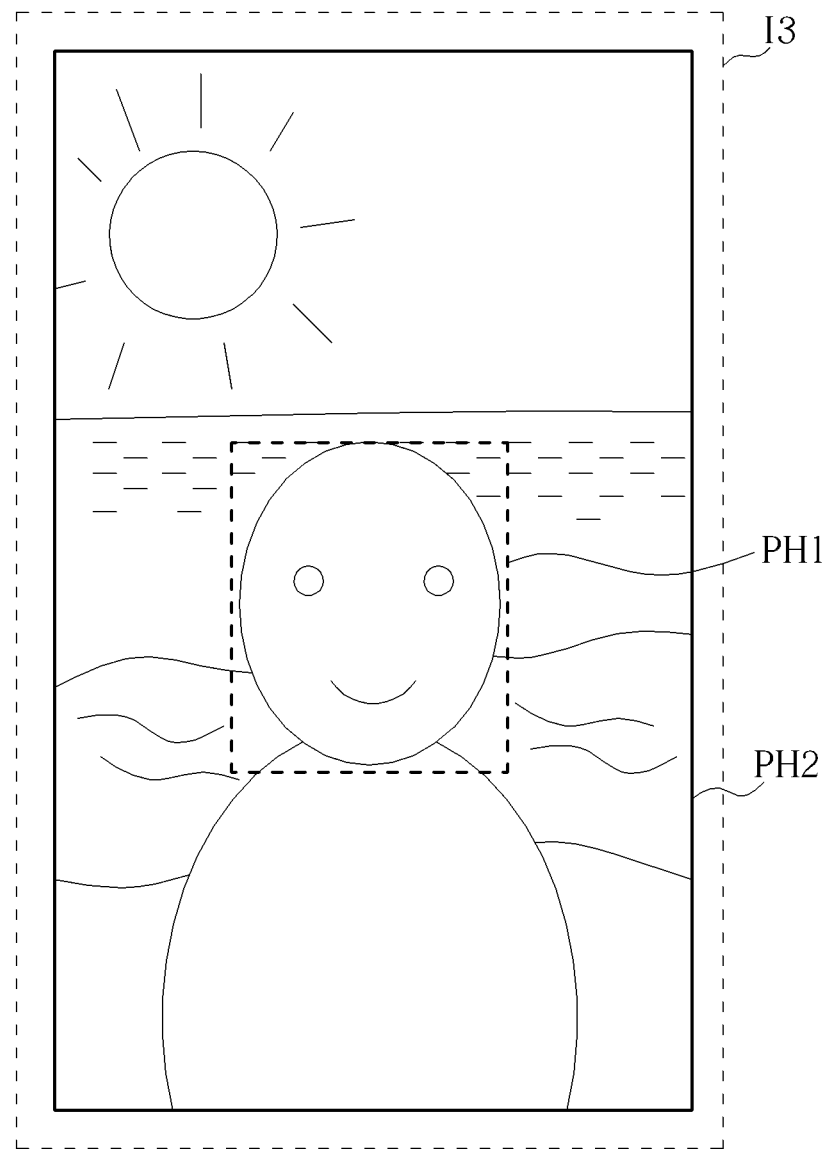
FIGS. 4-5 illustrate examples of how the image composition module shown in FIG. 1 generates a result image by combining a candidate portion of a consecutive plurality of second original images.

Please refer to FIG. 4, which illustrates an example of how the image composition module 250 generates the result image I3 by combining the candidate portion of the first original image PI1 and the consecutive plurality of second original images I2S, here collectively referred as original images I. As shown in FIG. 4, a face fragment PH1 is cropped from a first original image whose corresponding preview image having a highest score, and a background fragment PH2 is cropped from a reference original image, whose corresponding preview image having a next-to-highest score or an optional score, or predetermined (the first original image I1 or other selected from the plurality of second original images I2S). The face fragment PH1 and the background fragment PH2 are combined to generate the result image I3, i.e., the first original image and the reference original image are combined to generate the result image I3, so that the result image I3 can be immune from eye blink patterns and introduces a face smile pattern. In another example of the invention, the face fragment PH1 is blended with corresponding fragment of the reference original image so as to generate the result image i3.

Figure 5:
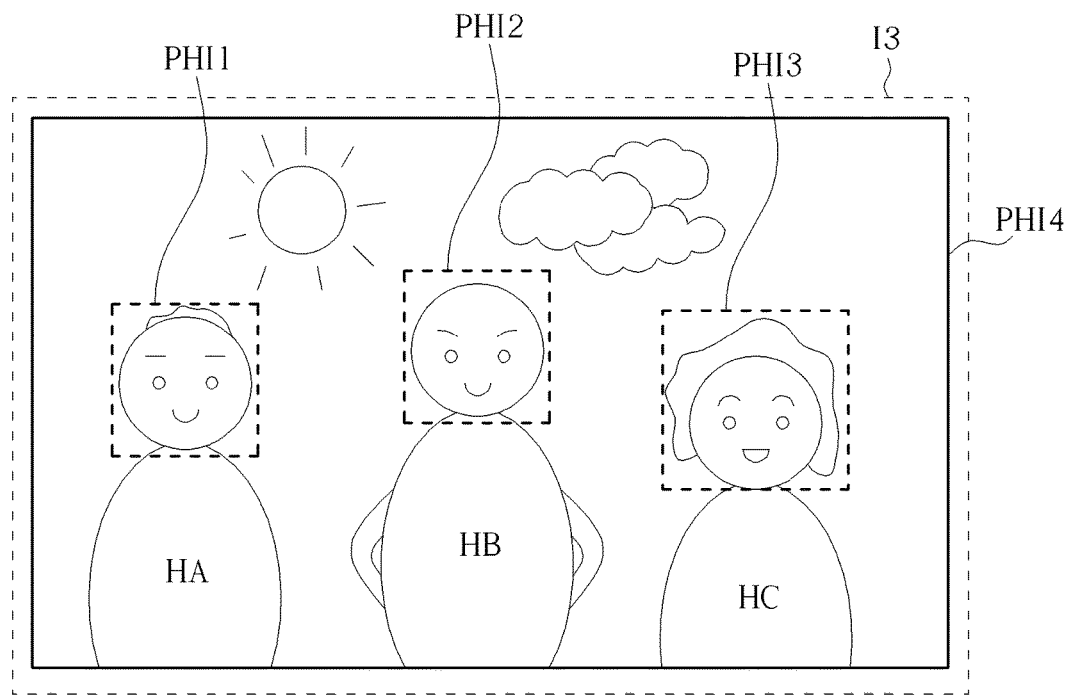

Please refer to FIG. 5, which also illustrates an example of how the image composition module 250 generates the result image I3 by combining the candidate portion of the first original image I1 and the consecutive plurality of second original images I2S, here referred collectively as original images I. As shown in FIG. 5, there are first fragment PHI1 cropped from a first original image OI1, a second fragment PHI2 cropped from a second original image OI2, a third fragment PHI3 cropped from a third original image OI3, and a fourth fragment PHI4 cropped from a fourth original image OI4 in the result image I3 capturing images of three people HA, HB, and HC.

As can be observed in the table shown in FIG. 5, under the supposition that the character 'B' indicates that no eye blink pattern is found and the character 'S' indicates that at least one face smile pattern is found, the table indicates: (1) the first original image OI1 captures no eye blink pattern and at least one face smile pattern from the person HA, captures at least one eye blink pattern and at least one face smile pattern from the person HB, and captures at least one eye blink pattern and at least one face smile pattern from the person HC; (2) the second original image OI2 captures no eye blink pattern and at least one face smile from the person HA, captures no eye blink pattern and at least one face smile pattern from the person HB, and captures at least one eye blink pattern and at least one face smile from the person HC; (3) the third original image OI3 captures at least one eye blink pattern and at least one face smile pattern from the person HA, captures at least one eye blink pattern and at least one face smile pattern from the person HB, and no eye blink pattern and at least one face smile pattern from the person HC; (4) the four original image OI4 captures at least one eye blink pattern and no face smile pattern from the person HA, captures no eye blink pattern and at least one face smile pattern from the person HB, and captures at least one eye blink pattern and at least one face smile pattern from the person HC.

As a result, since the person HA has a best camera shooting effect on the first original image OI1, the first fragment PHI1 is thus chosen and cropped from the first original image OI1 for capturing the image of the person HA, under the supposition that the person HA has a better grade on the first original image OI1 than the second original image OI2 does.

Since the person HB has a best camera shooting effect on the second original image OI2, the second fragment PHI2 is thus chosen and cropped from the second original image OI2 for capturing the image of the person HB, under the supposition that the person HB has a better grade on the second original image OI2 than the fourth original image OI4 does.

Since the person HC has a best camera shooting effect on the third original image OI3, the third fragment PHI3 is thus chosen and cropped from the third original image OI3 for capturing the image of the person HC.

Suppose that the background of the fourth original image OI4 has a best grade among all the original images, the fragment PHI4 is thus chosen and cropped from the fourth original image OI4 for forming the background of the result image I3.

After combining the fragments PHI1, PHI2, PHI3, and PHI4, i.e., after combining at least partial of the original images OI1, OI2, OI3, and OI4, the result image I3 is generated with the advantage of filtering off eye blink patterns and introducing face smile patterns.

The present invention discloses an image capture method and a mobile camera device utilizing the image capture method for introducing the advantage of filtering off eye blink patterns and introducing face smile patterns. With the aid of the disclosed image capture method and the disclosed mobile camera system of the present invention, the defect of the conventional digital camera that eye blink patterns cannot be efficiently excluded is effectively neutralized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing method, comprising:
   capturing a first original image;
   detecting eye blink patterns and face smile patterns in a first preview image corresponding to the first original image, wherein the first preview image is of smaller size and lower resolution than the first original image;
   capturing a consecutive plurality of second original images when at least one eye blink pattern is detected in the first preview image;
   generating a plurality of second preview images corresponding to the plurality of second original images, wherein the plurality of second preview images are of smaller size and lower resolution than the plurality of second original images;
   detecting eye blink patterns and face smile patterns in the plurality of second preview images; and
   generating a result image by combining non-eye-blink patterns and face smile patterns derived from different portions of different original images corresponding to the first preview image and the plurality of second preview images with least eye blink patterns and most face smile patterns;
   wherein the different original images are selected from the first original image and the plurality of second original images.

2. The method of claim 1, wherein the detecting of eye blink patterns and the face smile patterns further comprises:
   grading each of the plurality of preview images by a level of eye blink resemblance and a level of face smile resemblance.

3. The method of claim 2, wherein grading each of the plurality of preview images by the level of eye blink resemblance and the level of face smile resemblance comprises:
   grading a first preview image with a higher score than a second preview image having a higher level of eye blink resemblance and/or a lower level of face smile resemblance than the first preview image.

4. The method of claim 3, wherein the result image is generated further by utilizing one of the second original images having a corresponding preview image having a highest score among the plurality of preview images.

5. The method of claim 3, wherein the original images are corresponding to preview images having highest scores among the plurality of preview images.

6. The method of claim 2, wherein resolution of the first original image, the plurality of second original images and the result image, and a number of the plurality of second original images are assigned according to a touch command or a default setting.

7. A mobile camera device, comprising:
   an image sensor, configured to capture a first original image and configured to capture a consecutive plurality of second original images when at least one eye blink pattern is detected in the first original image; and
   an image signal processor, comprising:
      an image preview module, configured to generate a plurality of preview images corresponding to the plurality of original images respectively;
      an eye blink detection module, configured to detect eye blink patterns in the plurality of preview images;
      a face smile detection module, configured to detect the plurality of preview images for face smile patterns; and
      an image composition module, configured to generate a result image by combining non-eye-blink patterns and face smile patterns derived from different portions of different original images corresponding to the plurality of preview images with least eye blink patterns and most face smile patterns;
   wherein the plurality of preview images are of smaller size and lower resolution than the plurality of original images, and the different original images are selected from the first original image and the plurality of second original images.

8. The mobile camera device of claim 7, further comprising:
   an image grading module, configured to grade each of the plurality of preview images by a level of eye blink resemblance;
   wherein a first preview image with a higher score than a second preview image having a higher level of eye blink resemblance than the first preview image.

9. The mobile camera device of claim 8, wherein the image composition module is further configured to generate the result image by utilizing one of the original images having a corresponding preview image having a highest score among the plurality of preview images.

10. The mobile camera device of claim 7, wherein the eye blink detection module is further configured to determine a level of eye blink resemblance for each of the plurality of preview images, the face smile detection module is further configured to determine a level of face smile resemblance for each of the plurality of preview images, and the image grading module is further configured to grade each of the plurality of preview images according to the level of eye blink resemblance and the level of face smile resemblance.

11. The mobile camera device of claim 10, wherein the image grading module is further configured to grade a first preview image with a higher score than a second preview image having a higher level of eye blink resemblance and/or a lower level of face smile resemblance than the first preview image; and the image composition module is further configured to generate the result image by utilizing one of the plurality of original images having a corresponding preview image having a highest score among the plurality of preview images.

12. The mobile camera device of claim 7, wherein the plurality of original images are corresponding to preview images having highest scores among the plurality of preview images.

13. The mobile camera device of claim 7, further comprising:

a touch panel configured to receive a touch command for assigning resolution of the first original image, the consecutive plurality of second original images and the result image, and to receive another touch command for assigning a number of the consecutive plurality of second original images.

* * * * *